(12) United States Patent
Jaaskelainen

(10) Patent No.: US 11,204,434 B2
(45) Date of Patent: Dec. 21, 2021

(54) LARGE AREA SEISMIC MONITORING USING FIBER OPTIC SENSING

(71) Applicant: Halliburton Energy Services, Inc., Houston, TX (US)

(72) Inventor: Mikko Jaaskelainen, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 899 days.

(21) Appl. No.: 15/767,485

(22) PCT Filed: Dec. 16, 2015

(86) PCT No.: PCT/US2015/065941
§ 371 (c)(1),
(2) Date: Apr. 11, 2018

(87) PCT Pub. No.: WO2017/105416
PCT Pub. Date: Jun. 22, 2017

(65) Prior Publication Data
US 2018/0306936 A1    Oct. 25, 2018

(51) Int. Cl.
*G01D 5/26* (2006.01)
*G01V 1/22* (2006.01)
(Continued)

(52) U.S. Cl.
CPC ............. *G01V 1/226* (2013.01); *G01D 5/268* (2013.01); *G01H 9/004* (2013.01); *G01V 1/181* (2013.01);
(Continued)

(58) Field of Classification Search
CPC ................... G01V 1/226; G01V 1/181; G01V 2210/1429; G01V 2210/612; G01V 2210/6122; G01D 5/268; G01H 9/004
See application file for complete search history.

(56) References Cited

U.S. PATENT DOCUMENTS 5,466,923 A * 11/1995 Merletti ............... H03K 17/968
250/214 C
6,268,911 B1 * 7/2001 Tubel ...................... E21B 41/02
356/72
(Continued)

FOREIGN PATENT DOCUMENTS

WO   WO-2010116119 A2 * 10/2010   ......... G01D 5/35383
WO      2013090544 A1    6/2013
(Continued)

OTHER PUBLICATIONS

PCT Application Serial No. PCT/US2015/065941, International Search Report, dated Jul. 5, 2016, 4 pages.
(Continued)

*Primary Examiner* — Krystine E Breier
(74) *Attorney, Agent, or Firm* — Gilliam IP PLLC

(57) ABSTRACT

A system and method for seismic monitoring of large area subsurface reservoirs, for instance, the system comprising: multiple electro acoustic technology assemblies comprising seismic sensing elements, electronic circuits for converting the seismic sensing signals to frequencies, amplification circuitry to amplify the frequencies, an acoustic source that converts the amplified frequencies to an acoustic frequency signal; a fiber optic acoustic sensing system comprising a fiber optic cable deployed in a subsurface reservoir, where the multiple electro acoustic technology assemblies are proximate to and/or acoustic coupled with the fiber optic cable of the fiber optic acoustic sensing system, and a surface based distributed acoustic sensing interrogator connected to the fiber optic cable.

21 Claims, 6 Drawing Sheets

(51) Int. Cl.
*G01H 9/00* (2006.01)
*G01V 1/18* (2006.01)

(52) U.S. Cl.
CPC ............... *G01V 2210/1429* (2013.01); *G01V 2210/612* (2013.01); *G01V 2210/6122* (2013.01)

(56) References Cited

U.S. PATENT DOCUMENTS

| | | | |
|---|---|---|---|
| 6,305,227 B1* | 10/2001 | Wu | G01H 9/004 |
| | | | 73/705 |
| 9,003,888 B2 | 4/2015 | Lopez et al. | |
| 9,523,790 B1* | 12/2016 | Valishin | G01V 1/189 |
| 9,759,824 B2* | 9/2017 | Lumens | G01V 1/181 |
| 10,408,655 B2* | 9/2019 | Shen | G01F 15/022 |
| 10,444,392 B2* | 10/2019 | Milne | G01D 5/14 |
| 2010/0145622 A1 | 6/2010 | Haque et al. | |
| 2013/0242698 A1 | 9/2013 | McEwen-King et al. | |
| 2014/0036628 A1 | 2/2014 | Hill et al. | |
| 2014/0150523 A1* | 6/2014 | Stokely | E21B 47/135 |
| | | | 73/1.82 |
| 2014/0153364 A1 | 6/2014 | Lewis et al. | |
| 2014/0326860 A1 | 11/2014 | Choi et al. | |
| 2014/0334253 A1 | 11/2014 | Lumens et al. | |
| 2018/0136354 A1* | 5/2018 | Haldorsen | G01V 1/181 |
| 2018/0275297 A1* | 9/2018 | Park | G01V 1/40 |

FOREIGN PATENT DOCUMENTS

| | | | | |
|---|---|---|---|---|
| WO | 2015020642 A1 | 2/2015 | | |
| WO | WO-2015020642 A1 * | 2/2015 | ......... | G01D 5/35312 |

OTHER PUBLICATIONS

PCT Application Serial No. PCT/US2015/065941, International Written Opinion, dated Jul. 5, 2016, 7 pages.

* cited by examiner

LARGE AREA SEISMIC MONITORING USING FIBER OPTIC SENSING

BACKGROUND

This disclosure relates generally to systems and methods for enabling 4D seismic monitoring of large reservoirs where time lapse seismic provides important information for field management.

Fiber optic distributed sensing systems were developed in the 1980s to replace older measurement systems composed of multiple individual sensors.

Fiber optic distributed sensing systems are commonly based on Optical Time-Domain Reflectometry (OTDR) and utilizes techniques originally derived from telecommunications cable testing. Today fiber optic distributed sensing systems provides a cost-effective way of obtaining hundreds, or even thousands, of highly accurate, high-resolution measurements and today find widespread acceptance in industries such as oil and gas, electrical power, and process control.

There is a need to monitor large reservoir areas to better understand how to optimize sweep efficiencies, improve recovery and reduce production costs. Current sensing systems use radio links (or wired systems) with 3 component (3C) sensors to give a 3 dimensional (3D) snapshot of the reservoir, and these systems have high-end electronics (A/D converters, data acquisition, timing circuitry, complex telemetry, etc.) and are deployed for each survey and then retrieved. Repeat deployment of sensing pads puts heavy requirements on reliability, ruggedized systems where operation may be limited by battery life further driving sensor and survey cost. Wired systems will have challenges with weight and electrical connectors as many of these systems are modular where the connectors are bulky and prone to various contact issues resulting in intermittent faults causing down time. Repeat surveys must then be made to get 4D data, i.e. 3C data (3D)+time dimension gives you 4 dimensions (4D) data. This can then be used to manage a reservoir over time. The cost of the sensing pads and system is very high so the system must have a high utilization ratio to be able to recover the capital cost and make this a viable solution for a service company. The cost of a survey is also very high to a customer both due to the capital cost charge to the service company, labor cost to deploy the system and everybody needs to make some profit to make this a viable business.

Fiber optic sensing systems for permanent surveys have been under investigation for many years and there have been some deployments. The main benefit with fiber optic sensing systems is that it removes the need for complex electronics, and this is beneficial in e.g. in-well and ocean bottom monitoring systems as deployed by PGS exploration, Stingray Geophysical, USSI, MagiQ and others. There are however challenges with fiber optic point sensing systems for this type of surveys, and some of the main issues are:

Manufacturing complexity is a challenge, as fiber optic sensors require considerable manual labor and optical splices. Cost is another challenge as fiber optic sensor system manufacturing is often a very labor-intensive production process with heavy investment in specialized equipment like splicers and fiber winders. Optical cables need to be cut to access optical fibers and sensors needs to be spliced in, and the sensors, splices and optical fibers must then be packaged and protected. Reliability is another concern as a single signal chain will have tens, if not hundreds of optical splices. Fiber optic sensors can also have complex and bulky cables that are difficult to handle and deploy.

Another important consideration is Industry acceptance. Geophones are widely accepted and well understood, whereas optical sensing technology is still new to many people in the industry.

U.S. Pat. No. 9,003,888B2, "Areal Monitoring Using Distributed Acoustic Sensing" and US2013/0242698A, "Seismic Surveying using Fiber Optic Technology" are using Distributed Acoustic Sensing (DAS) to reduce the sensing cable manufacturing complexity, cost and reliability. Both acknowledge that the current electrical sensing solutions are costly, but fail to recognize that the cost is mainly in the electronics and not in the sensor itself. There are several challenges with this optical DAS approach:

The Signal to Noise Ratio (SNR) is relatively low and this requires a large number of source events or sweeps with vibro-seis trucks. US2013/0242698A attempts to mitigate this by spiraling the sensing fiber along a circular object to get more sensing fiber per unit cable length as sensitivity would be proportional to length of sensing fiber.

The directionality of seismic signals may be hard to determine, which is why both US 2013/0242698A and U.S. Pat. No. 9,003,888B2 mention deploying the optical sensing fiber in Archimedean spirals as this may allow determination of directionality assuming that the SNR is sufficiently high.

WO2013/090544A I "Detecting Broadside Acoustic Signals with a Fiber Optical Distributed Acoustic Sensing (DAS) Assembly" attempts to determine the directionality by using multiple fibers in various configurations. This cable design is complex to manufacture and must be deployed in a certain orientation causing additional challenges during manufacture and deployment.

All DAS based systems provide a large amount of data at lower sensitivity, i.e., terabytes upon terabytes of data, and this rapidly causes bottlenecks in data handling and processing. This is recognized in US2014/0334253A I "Seismic Monitoring" where geophones are used as triggers detect relevant events and to start recording at those events and thereby limiting the DAS data volume. The use of an optical inline geophone is mentioned for triggers, but the complexity, cost and reliability then come into play similarly as with the all-optical systems from USSI, MagiQ, PGS Exploration etc.

While many of these systems show promise, they all have drawbacks and this poses a challenge that in many instances fail to meet both financial objectives, good SNR of the collected seismic signals and manageable data volumes. There is therefore a need for a more cost efficient solution to enable high SNR 4D monitoring.

The systems and methods described herein address these needs.

DETAILED DESCRIPTION

Figure 1:
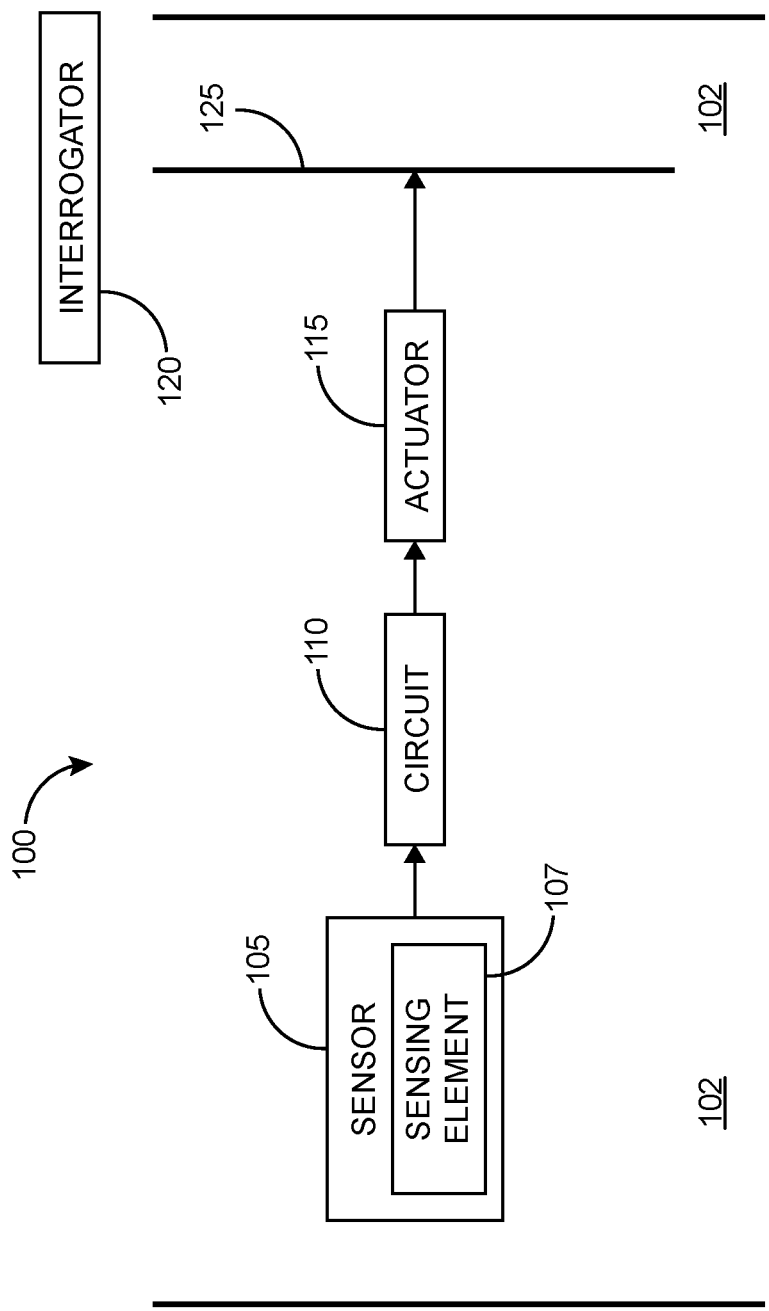
FIG. 1 illustrates the electro acoustic technology (EAT) concept for seismic monitoring.

In the following detailed description, reference is made to accompanying drawings that illustrate embodiments of the present disclosure. These embodiments are described in sufficient detail to enable a person of ordinary skill in the art to practice the disclosure without undue experimentation. It should be understood, however, that the embodiments and examples described herein are given by way of illustration only, and not by way of limitation. Various substitutions, modifications, additions, and rearrangements may be made without departing from the spirit of the present disclosure. Therefore, the description that follows is not to be taken in a limited sense, and the scope of the present disclosure will be defined only by the final claims.

The proposal is to use a recently developed electro acoustic technology to create a 3-part solution to overcome the aforementioned challenges with existing systems.

The first part is to use electro acoustic technology (EAT) assemblies in which the use of existing widely accepted geophones (or accelerometers) provides high performance sensing elements. Electrical geophones for high end seismic applications cost $100-$200 each. Low cost electronics are then used to convert the sensor signal to a frequency, and the frequency is converted to an acoustic frequency signal. Multiple frequencies could be used to differentiate between X/Y/Z components in a 3D sensor package. The EAT transmission frequencies could be selected to be outside the seismic signal range of interest. The seismic range of interest for reflection seismic is in the 0-250 Hz range and 0-2,000 Hz for micro-seismic applications. The low cost electronics would use simple analog electronics and avoid high-end analog to digital converters, including data acquisition/timing circuitry and complex telemetry electronics It should be noted that that a very large portion of the system cost of electronic seismic systems is in the high-end electronics.

In another embodiment a digital version of the electronics could be used in which the initial sensor is still an analog sensor but then analog to digital converters are used and the signal is continuously transmitted in a digital format. This solution would require a more costly set of electronics but still without data acquisition/timing circuitry and complex telemetry. The advantage of this approach may be a better signal to noise ratio as analog signals would have a signal to noise ratio that would decrease with distance along the optical fiber.

One of the results of the new approaches described herein is a low-cost package that can hold the sensors and electronics, while providing proximity and coupling of an EAT assembly to a fiber optic cable. A battery may be included in the package and/or a power supply may be included to power the electronics and/or charge the batteries. The electro acoustic technology to be used is described below in conjunction with the supplied Figures.

The second part is the applied use of fiber optic Distributed Acoustic Sensing (DAS) systems connected to an off-the shelf low-cost fiber optic cable. The fiber optic cable will be co-located with the electro acoustic technology and be exposed to the acoustic frequency. The DAS system will interrogate the optical fiber cable and detect the acoustic frequency. The DAS system will determine the location of the sensor by time of flight and/or acoustic frequency. This step also includes software to convert the acoustic frequency to the measured electrical sensor signal.

The third part is a system to power the EAT using an off-the-shelf electrical cable with at least one conductor, preferably two or more conductors. A simple electrical connection can be used that will make contact with the electrical conductor. This could be a pre-manufactured cable of desired length that could be used to connect two EAT assemblies. The desired length may be equal to the desired sensing station spacing if daisy chained, or twice the station spacing if two power circuits are used. Finally a power supply that may be connected on demand to power up the EAT assemblies.

The 3-part implementation provides a low-cost solution to instrument a large area with high performance seismic sensors. The performance is equal to existing electrical seismic systems at a fraction of the cost. The data quality will be better for 4D surveys as the sensors are permanently deployed and left in a fixed position, whereas the sensor position and sensor coupling will vary between different 3D surveys repeated over time. Varying sensor positions between surveys and data sets will introduce variability in the sensor data.

Description of EAT (Electro Acoustic Technology) Sensors

The EAT sensors and EAT sensing technology described in this disclosure is a recently developed technology and has been described in a recently published PCT application: WO2015020642A1.

EAT Sensors represent a new approach to fiber optic sensing in which any number of downhole sensors, electronic or fiber optic based, can be utilized to make the basic parameter measurements, but all of the resulting information is converted at the measurement location into perturbations or a strain applied to an optical fiber that is connected to an interrogator that may be located at the surface of a downhole well. The interrogator may routinely fire optical signal pulses downhole into the optical fiber. As the pulses travel down the optical fiber back scattered light is generated and is received by the interrogator.

The perturbations or strains introduced to the optical fiber at the location of the various EAT sensors can alter the back propagation of light and those effected light propagations can then provide data with respect to the signal that generated the perturbations.

The EAT sensor system can be best understood by reference to FIG. 1, which is an example embodiment of an EAT sensor system. System 100 can include a sensor 105, a circuit 110 coupled to the sensor 105, an actuator 115 coupled to the circuit 110, and an interrogator 120. The sensor 105 is operable to provide a measurement corresponding to a parameter at a location in a region 102. The sensor 105 can be realized in a number of different ways depending on the parameter to be determined by the measurement using the sensor 105. The parameter can include, but is not limited to, a chemical concentration, a pH, a temperature, a vibration, or a pressure. The sensor 105 has the capability of being disposed at a location in proximity of an optical fiber cable 125. The sensor 105 can be located downhole at a drilling site with the interrogator 120 at the surface of the drilling site. The drilling site may be terrestrial or sea-based. Components of the system 100 may be disposed outside casing in cement or strapped to a production tube in a permanent installation. Components of the system 100 also may be disposed in a coiled tube that can be pushed through into a horizontal area of operation, or a wire line cable that can be tractored into a wellbore using an electrically driven tractor that pulls the wire line cable into the wellbore, or pumped into a wellbore with fluid that push/ pulls a cable into the wellbore. The system 100 may be used with other drilling related arrangements. The circuit 110, coupled to the sensor 105, can be structured to be operable to generate a signal correlated to the parameter in response to the measurement by the sensor 105. The circuit 110 may be integrated with the sensor 105. For example, a sensing element 107 may be an integral part of the circuit 110 or directly coupled to a component of the circuit 110. The sensing element 107 may be a diaphragm directly coupled to a component of the circuit 110.

The actuator 115 can be coupled to the circuit 110 to receive the signal generated in response to the measurement by the sensor 105. The signal can be a compensated signal, where a compensated signal is a signal having a characteristic that corresponds to the parameter of interest for which variations in one or more other parameters is substantially corrected or removed, or for which the characteristic is isolated to the parameter of interest. The actuator 115 can be integrated with the circuit 110, integrated with the circuit 110 that is integrated with the sensor 105, or a separate structure coupled to the circuit 110.

The actuator 115 can be structured to be operable to generate a perturbation, based on the signal, to an optical fiber cable 125, that may include one or multiple optical fibers. The actuator 115 can be positioned in proximity to the optical fiber cable 125 at the effective location of the sensor 105. The actuator 115 can be structured to be operable to generate the perturbation to the optical fiber cable 125 with the actuator 115 in contact with the optical fiber cable 125. The actuator 115 can be structured to be operable to generate the perturbation to the optical fiber cable 125 with the actuator 115 a distance from the optical fiber cable 125. The actuator 115 may be realized as a non-contact piezoelectric material, which can provide acoustic pressure to the optical fiber cable 125 rather than transferring vibrations by direct contact.

The optical fiber cable 125 can be perturbed with the optical fiber cable 125 in direct contact with the actuator 115 structured as a vibrator or with the actuator 115 structured having a form of voice coil at a distance away from the optical fiber cable 125. The perturbation of the optical fiber can be provided as a vibration of the optical fiber cable 125 or a strain induced into the optical fiber cable 125. Other perturbations may be applied such that the characteristics of the optical fiber are altered sufficiently to affect propagation of light in the optical fiber cable 125. With the effects on the light propagation related to a signal that generates the perturbation, analysis of the effected light propagation can provide data with respect to the signal that generates the perturbation.

The interrogator 120 can be structured to interrogate the optical fiber cable 125 to analyze signals propagating in the optical fiber cable 125. The interrogator 120 can have the capability to couple to the optical fiber cable 125 to receive an optical signal including the effects from the perturbation of the optical fiber cable 125 and to extract a value of the parameter of the measurement in response to receiving the optical signal from the perturbation. In an embodiment, the received signal may be a backscattered optical signal. The interrogator 120 may be structured, for example, to inject a short pulse into the optical fiber cable 125. An example of a short pulse can include a pulse of 20 nanoseconds long. As the pulse travels down the optical fiber cable 125, backscattered light is generated. Interrogating a location that is one kilometer down the fiber, backscattered light is received after the amount of time it takes to travel one kilometer and then come back one kilometer, which is a round trip time of about ten nanoseconds per meter. The interrogator 120 can include an interferometric arrangement. The interrogator 120 can be structured to measure frequency based on coherent Rayleigh scattering using interferometry, to measure dynamic changes in attenuation, to measure a dynamic shift of Brillouin frequency, or combinations thereof.

The interrogator 120 can be arranged with the optical fiber cable 125 to use an optical signal provided to the interrogator 120 from perturbing the optical fiber cable 125 at a location along the optical fiber cable 125. An arrangement different from using an optical signal backscattered from the perturbation can be utilized. For example, the optical fiber cable 125 can be structured having an arrangement selected from a fiber Bragg grating disposed in the optical fiber in vicinity of the actuator for direct wavelength detection based acoustic sensing, a non-wavelength selective in-line mirror disposed in the optical fiber in vicinity of the actuator, intrinsic Fabry-Perot interferometers as a mode of interrogation from fiber Bragg gratings placed apart in the optical fiber such that each fiber Bragg grating Fabry-Perot cavity is in vicinity of a respective actuator, Fizeau sensors in the optical fiber, a second optical fiber to transmit an optical signal from a perturbation of the optical fiber to a detection unit of the interrogator, or other arrangements to propagate a signal, representative of a measurement, in an optical fiber to an interrogation unit to analyze the signal to extract a value of a parameter that is the subject of the measurement.

The possible advantages from using the above described EAT systems in a variety of configurations may include using a variety of sensors, either electrical or fiber optic based, to measure for example a chemical concentration, a pH, a temperature, or a pressure and using a common optical fiber connected to a surface interrogator to measure perturbation signals from each EAT sensor location distributed along that common optical fiber and analyzing those signals to extract values of the parameters being measured. The approach can significantly reduce manufacturing complexity, reduce very expensive labor intensive production with expensive equipment like splicers and fiber winders, improve reliability, and widen industry acceptance by allowing the use of sensing technologies of choice.

This disclosure describes novel approaches to using this type of sensor technology in new ways. In particular it describes the use of many low cost and widely used geophones (or accelerometers)

Figure 2:
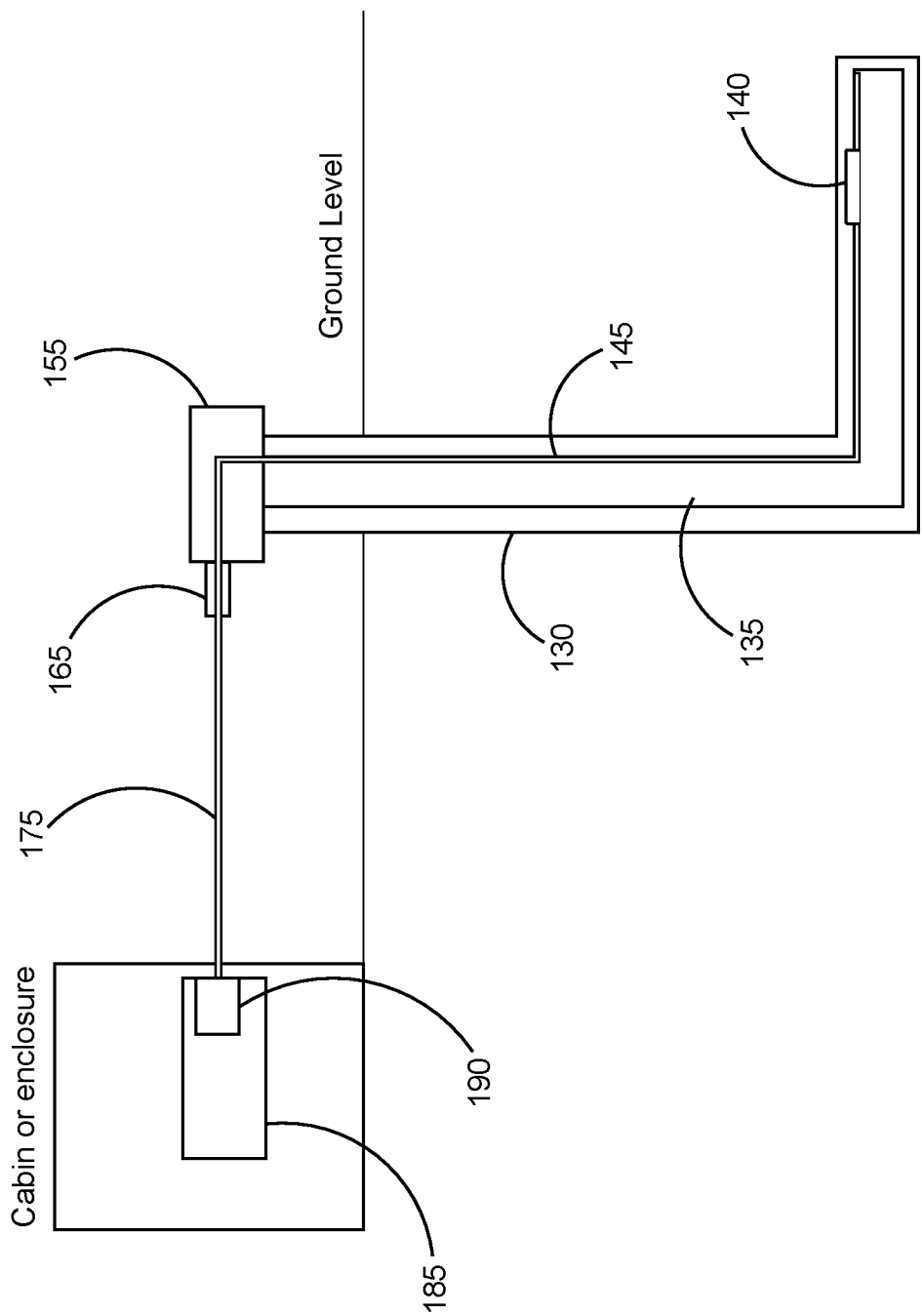
FIG. 2 illustrates a more complete system for utilizing electro acoustic technology in a subsurface well.

FIG. 2 expands on the use of electro acoustic technology (EAT) sensing systems by illustrating a more complete system. A subsurface well 130 is illustrated, in which a production casing 135 is shown extending through the well. In some applications the production casing may be non-metallic. At the far downhole end of the well an electro acoustic technology sensor assembly 140 is shown. In this example it is shown on the outside of the casing. In some applications the EAT sensor assembly could be within the casing. In many applications there could be multiple EAT sensor assemblies and the technology can easily accommodate that. In close proximity to the EAT sensor assembly shown is a fiber optic cable 145 that is deployed all through the well and back to the surface, then through a wellhead 155. The fiber optic cable 145 may be clamped to the EAT sensor assembly 140 to ensure good transmission of signals. The fiber optic cable 145 exits through a wellhead exit 165 and is connected using a surface fiber cable 175 within an outdoor cabin or enclosure to a Distributed Acoustic System (DAS) interrogator 185. The interrogator may then have a laser source 190 that fires interrogation pulses down through the fiber optic cable and receives backscattered light back from the fiber optic cable.

The fiber optic cable 145 may be permanently installed, or in some applications could be attached to some type of logging cable such as wireline or slickline cables. It could also be clamped on tubing inside the casing 135 in some applications.

Figure 3:
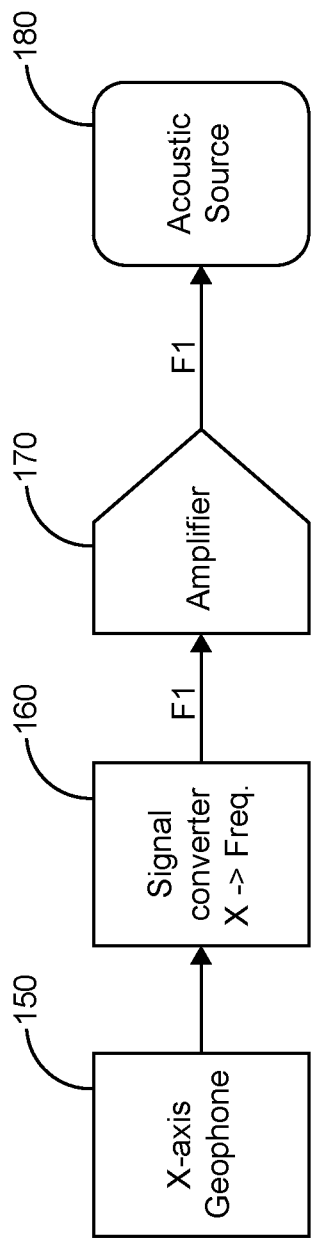
FIG. 3 illustrates a single axis sensor electro acoustic technology block diagram.

FIG. 3 illustrates how the EAT technology can be used to generate acoustic signals by use of low cost geophones. FIG. 3 is a block diagram of a single axis sensor electro acoustic technology (EAT) assembly using an X-axis geophone 150 feeding a signal converter 160 that converts the signal to a frequency F1 that is amplified in amplifier 170 to then actuate an acoustic source 180. The linkage of that acoustic source to a fiber optic cable that is in communication with a surface interrogation system will be illustrated in FIGS. 4 and 5.

Figure 4:
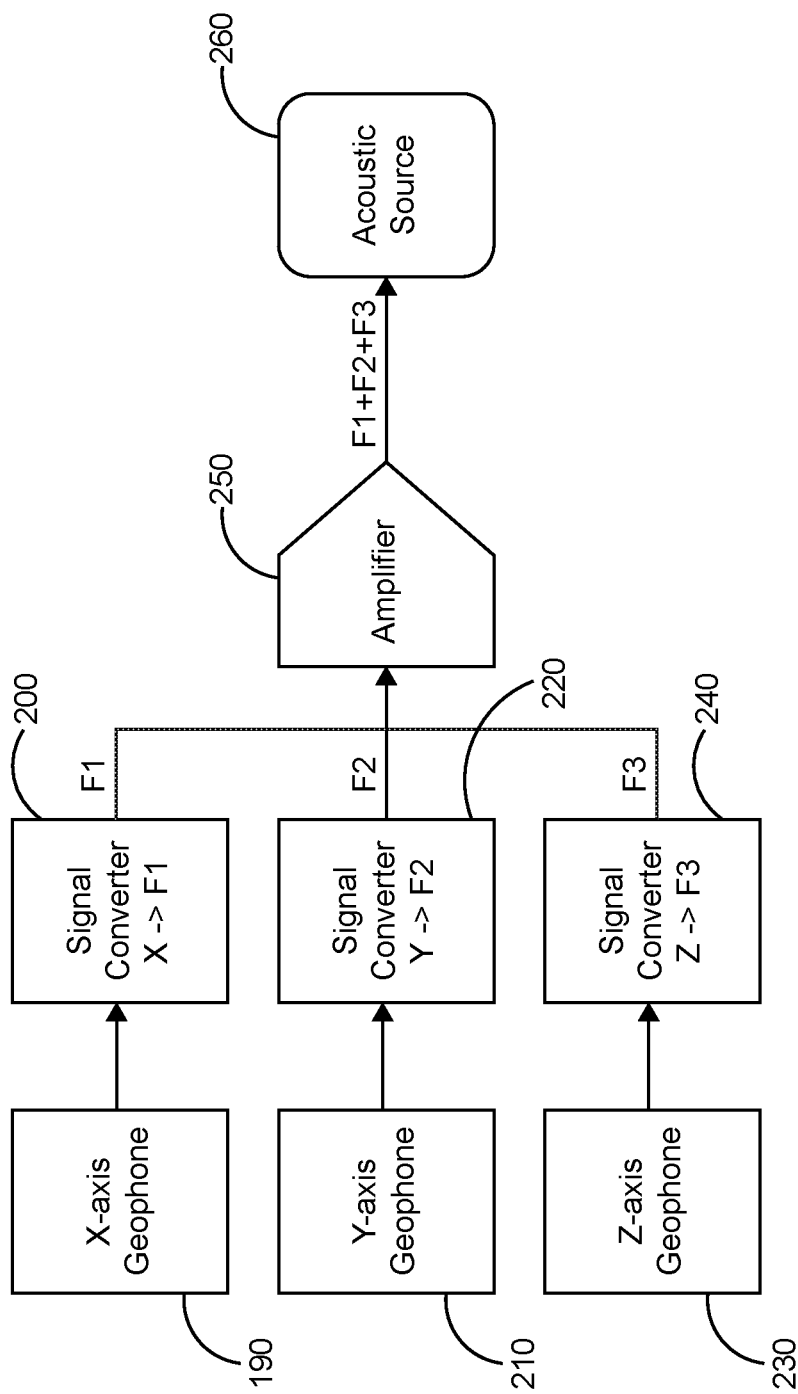
FIG. 4 illustrates a 3-axis sensor electro acoustic technology block diagram.

FIG. 4 illustrates a further expanded concept of application of this technology to a 3-axis geophone system. FIG. 4 is a block diagram of a 3-axis sensor electro acoustic technology geophone based system utilizing X, Y, and Z axis geophones 190, 210, 230 feeding to three signal converters 200, 220, 240 that output three different frequency signals that are amplified in amplifier 250 and used to actuate acoustic source 260.

It should be noted that this application of the EAT technology is not limited to geophones as the sensing element. As mentioned earlier, the sensing element in an EAT system could also be a chemical concentration, a pH, a temperature, a vibration, a pressure, or others. This disclosure anticipates any of these sensing elements as possibilities.

Figure 5:
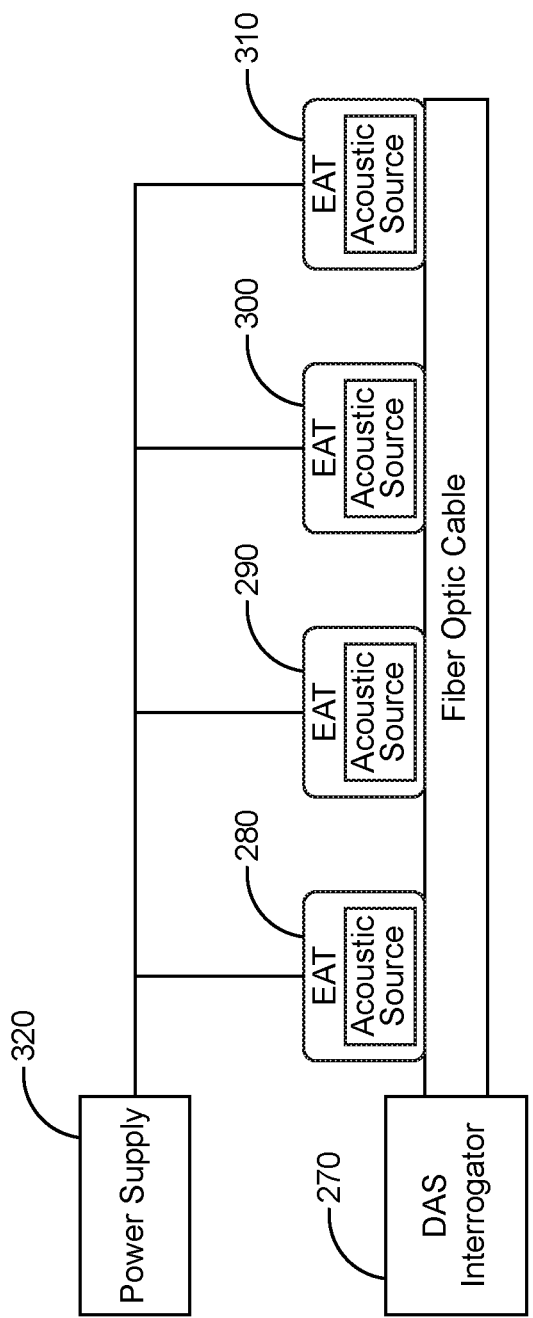
FIG. 5 illustrates an electro acoustic technology system with a DAS interrogator and Power Supply.

In FIG. 5 the complete integrated concept can be seen. Multiple EAT systems 280, 290, 300, 310, each coupled to an acoustic source that is in close proximity (or in contact) to an extended fiber optic cable that extends to a surface installation and is connected to a DAS interrogator 270. The EAT's are supplied by a power supply 320 in this example. The DAS system will interrogate the optical fiber and detect the acoustic frequency. The DAS system can determine the location of the sensor by time of flight and/or acoustic frequency.

Figure 6:
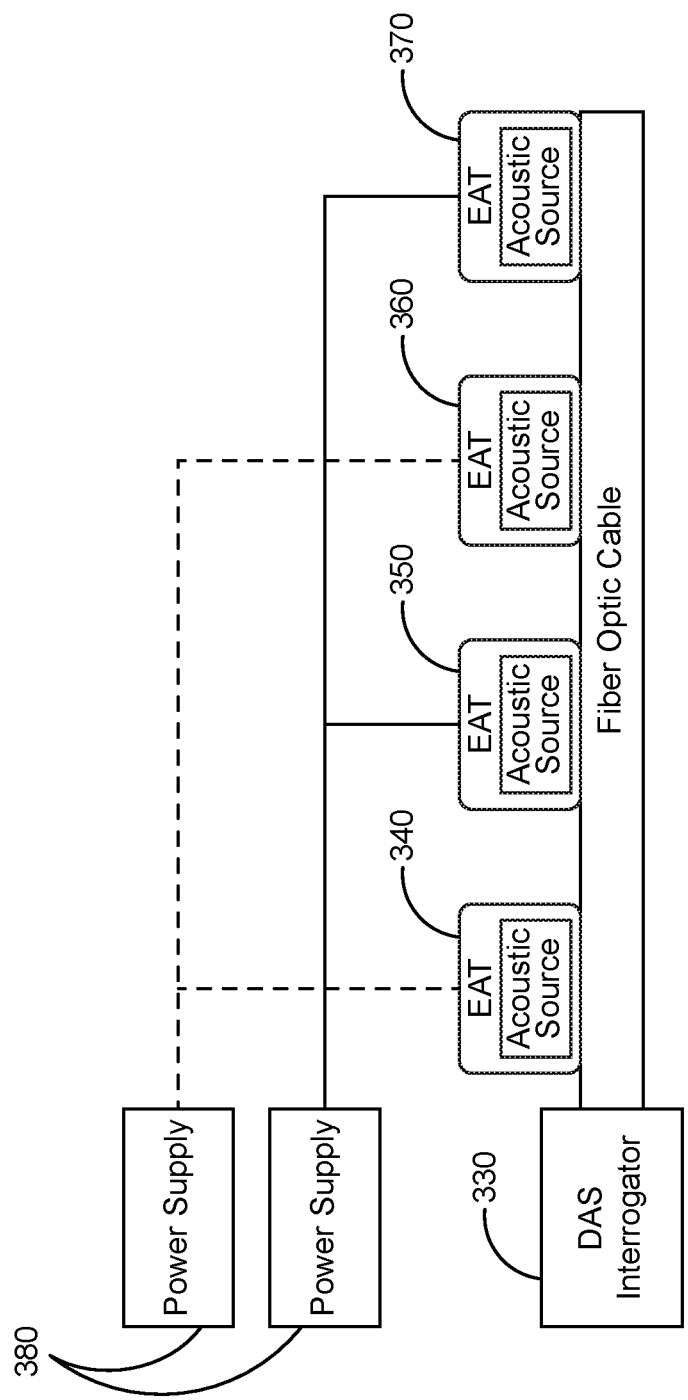
FIG. 6 illustrates an alternate electro acoustic technology system with a DAS interrogator and Power Supply.

FIG. 6 illustrates a related but alternate arrangement to FIG. 5, in which there are two power supplies 380, and they are configured to supply different EAT systems 340, 350, 360, 370.

The benefits of this proposal are that it allows for permanently deployed high performance seismic sensors, the use of widely accepted electrical sensors, the use of low cost optical and electrical cables, the use of low cost off-the-shelf electrical components, and the use of current existing DAS systems, or other interferometric sensing systems like FBG based intrinsic Fabry-Perot and/or Sagnac interferometers.

The resulting solution is simple to ship and assemble in the field as the components can be shipped in several parts and/or ordered from multiple suppliers. The separate components are EAT assemblies, optical fiber cables, electrical cables, DAS interrogators, and electrical power supplies. These are low cost as the same parts can be manufactured in large batches.

Another obvious advantage is that a reasonable amount of data can be used in that the user may select to only keep the data from the high SNR EAT based geophone stations, even though DAS data can be collected along the sensing cable. The user may also select to enhance DAS data processing based on the information from the fixed sensor stations.

Although certain embodiments and their advantages have been described herein in detail, it should be understood that various changes, substitutions and alterations could be made without departing from the coverage as defined by the appended claims. Moreover, the potential applications of the disclosed techniques are not intended to be limited to the particular embodiments of the processes, machines, manufactures, means, methods and steps described herein. As a person of ordinary skill in the art will readily appreciate from this disclosure, other processes, machines, manufactures, means, methods, or steps, presently existing or later to be developed that perform substantially the same function or achieve substantially the same result as the corresponding embodiments described herein may be utilized. Accordingly, the appended claims are intended to include within their scope such processes, machines, manufactures, means, methods or steps.

The invention claimed is:

1. A system comprising:
multiple electro-acoustic assemblies, wherein each electro-acoustic assembly comprises at least one seismic sensor,
a signal converter, wherein the signal converter converts an output of the at least one seismic sensor to a first frequency, an amplifier, wherein the amplifier amplifies the first frequency, and an acoustic source, wherein the acoustic source emits a second frequency based on the first frequency as amplified by the amplifier; and
a fiber optic sensing system comprising a fiber optic cable deployed in a reservoir and a surface based interrogator connected to the fiber optic cable,
wherein the multiple electro-acoustic assemblies are acoustically coupled to the fiber optic cable.

2. The system of claim 1 wherein the at least one seismic sensor is a geophone.

3. The system of claim 1 wherein the at least one seismic sensor is an accelerometer.

4. The system of claim 1 wherein the output of the at least one seismic sensor is an analog signal, and wherein each electro-acoustic assembly further comprises an analog to digital converter, wherein the analog to digital converter converts the output of the at least one seismic sensor from an analog signal to a digital signal.

5. The system of claim 1 wherein each electro-acoustic assembly further comprises a power source.

6. The system of claim 5 wherein the power source comprises one or more batteries.

7. The system of claim 5 wherein the power source is connected to each electro-acoustic assembly via one or more electrical conductors.

8. The system of claim 1 wherein the multiple electro-acoustic assemblies are acoustically coupled to the fiber optic cable by physical contact.

9. A method comprising:
interrogating, via a distributed acoustic sensing (DAS) interrogator, an optical fiber, wherein the optical fiber is acoustically coupled to one or more electro-acoustic assemblies, wherein each electro-acoustic assembly includes at least one sensor and at least one actuator, and wherein each actuator generates at least one acoustic frequency in response to an output of the at least one sensor;
based on the interrogation, detecting one or more acoustic frequencies generated by each actuator;
for each detected actuator-generated acoustic frequency, determining the output of the at least one sensor and a location of each actuator based on the detected actuator-generated acoustic frequency; and monitoring a reservoir based on the determined output of the at least one sensor and the location of each actuator.

10. The system of claim 1, wherein the at least one seismic sensor is a first seismic sensor of a three-axis geophone system.

11. The system of claim 1, wherein at least one electro-acoustic assembly comprises a second seismic sensor, wherein the signal converter converts an output of the second seismic sensor to a third frequency, wherein the amplifier amplifies the third frequency, and wherein the acoustic source emits a fourth frequency based on the third frequency as amplified by the amplifier.

12. The system of claim 11, wherein the first frequency and the third frequency are different.

13. The system of claim 1, wherein the second frequency is the first frequency.

14. The system of claim 1, wherein the seismic sensor detects at least one acoustic frequency of the reservoir and wherein the first frequency is a first of the at least one acoustic frequency of the reservoir.

15. The system of claim 1, wherein the seismic sensor detects at least one acoustic frequency of the reservoir and wherein the output of the at least one seismic sensor is a compensated signal based on the at least one acoustic frequency of the reservoir.

16. The method of claim 9, wherein determining the location of each actuator comprises determining a time of flight for the one or more acoustic frequency generated by each actuator based on the interrogation.

17. The method of claim 9, wherein each actuator generates a characteristic frequency and wherein detecting the one or more acoustic frequencies comprises detecting the characteristic frequency.

18. The method of claim 9, where the at least one sensor is a three-axis seismic sensor wherein each actuator generates a first frequency, a second frequency, and a third frequency respectively corresponding to a first axis, a second axis, and a third axis of the three-axis seismic sensor.

19. The method of claim 9, further comprising:

for each actuator-generated acoustic frequency, determining an input detected by at least one sensor based on the output of the at least one sensor, wherein monitoring the reservoir comprises generating a three-dimensional model of the reservoir based on the determined inputs and the location of each actuator.

20. A system comprising:

a seismic source, wherein the seismic source emits at least a first frequency into a subsurface field;

a fiber optic sensing system a fiber optic cable deployed in the subsurface field, and an interrogator connected to the fiber optic cable; and multiple electro-acoustic assemblies deployed in the subsurface field, wherein each electro-acoustic assembly comprises at least one seismic sensor and an acoustic source, wherein the acoustic source emits an acoustic signal with an acoustic frequency based on an output of the at least one seismic sensor, wherein the acoustic source is acoustically coupled to the fiber optic cable, wherein the interrogator detects the acoustic frequencies of the multiple electro-acoustic assemblies and wherein the interrogator generates a first three-dimensional seismic survey based on the acoustic frequencies of the multiple electro-acoustic assemblies detected during a first time period after the seismic source emits the first frequency.

21. The system of claim 20, wherein the interrogator generates a second three-dimensional seismic survey based on the acoustic frequencies of the multiple electro-acoustic assemblies detected during a second time period after the seismic source emits the first frequency.

* * * * *